Oct. 17, 1950  J. L. MICHAELIS  2,526,496
ELECTRICAL MEASURING AND ENERGY CONTROL SYSTEM
Filed Nov. 6, 1948
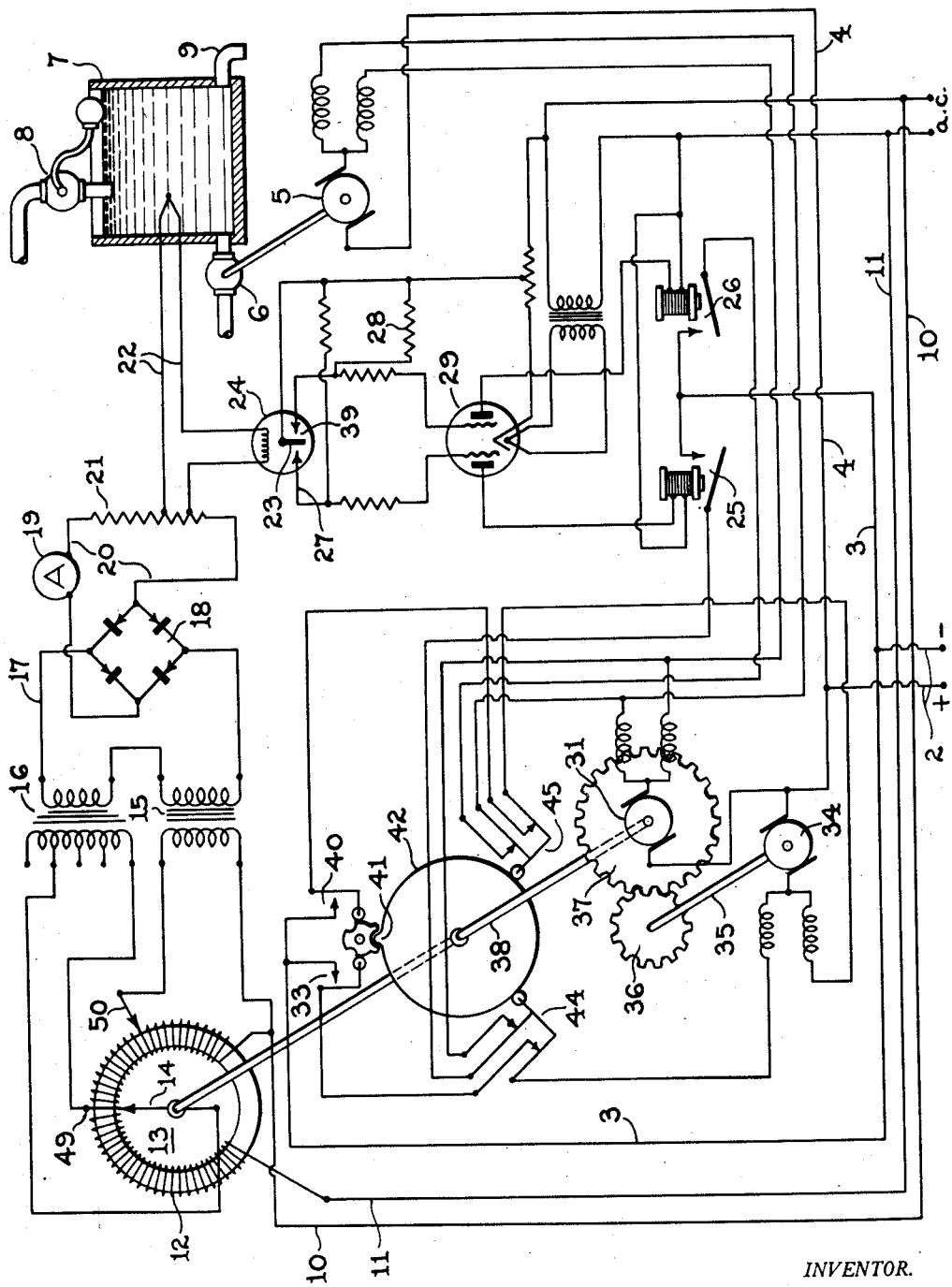
INVENTOR.
JOHN L. MICHAELIS
BY Archworth Martin
ATTORNEY Patented Oct. 17, 1950

2,526,496

UNITED STATES PATENT OFFICE 2,526,496

ELECTRICAL MEASURING AND ENERGY CONTROL SYSTEM

John L. Michaelis, New Martinsville, W. Va.

Application November 6, 1948, Serial No. 58,675

3 Claims. (Cl. 318—28)

My invention relates to a control system or apparatus whereby a desired normal condition is automatically maintained in a simplified and improved manner.

For example, the system may be used to control water temperature, as hereinafter described, and may also be used in various other ways, wherever a change from a normal or desired condition has the effect of changing the flow in an electrical measuring circuit such as that of a thermocouple.

For example, such a circuit can be utilized to control the speed of a motor, or control mechanical forces or illumination, where changes in such speed, forces, pressure or illumination produce a fluctuation in current flow in a control circuit. For example, piezo crystals can be used to produce a voltage proportional to a mechanical force or pressures, and there are photo-electric cells which will produce a D. C. voltage proportional to the illumination on the surface of the cell.

Another object of my invention is to provide a control system of the character referred to wherein a control circuit or a measuring and control circuit that uses the null balance method, by an appropriate measuring element, is employed to reach a desired balanced condition, there being three distinct voltages involved in effecting such measurement and balance; i. e.

A. A pre-set adjustable (standard) reference voltage.
B. An unknown (variable) voltage that is to be measured and/or controlled.
C. A correction voltage exactly equal (either additive or subtractive) to the difference between A and B above.

Another object of the invention is the provision of a system which employs a unique principle involving the use of electrical impulses to drive an electric motor that produces a correction voltage operating to correct deviations from a normal condition, either in an additive or a subtractive manner, and to simultaneously use the same electrical impulse to energize a remote operator or mechanism that produces a corrective source of energy necessary to return the system to a desired value.

The single figure of the drawing is a diagrammatic and schematic view showing the system which I employ.

In this instance, the system is shown as controlling the temperature of water in a tank, but it will be understood that, as above indicated, another control circuit subject to changes in physical condition that is to be controlled can be substituted for the thermocouple circuit 22.

The numeral 2 represents wires supplied with D. C. current from a suitable source. These wires, together with conductors 3 and 4, supply current to a reversible motor 5 that is here shown as employed for opening and closing a valve 6 that admits steam to a tank 7 which contains water whose temperature is to be maintained at say 160° F., the water level being automatically maintained by a float-actuated valve 8, as water is drawn off through a pipe 9.

Conductors 10 and 11 have connection with coil 12 of an autotransformer 13. This transformer has a pointer 14 that is automatically moved back and forth along the coil 12 by a motor 31 or a motor 34 and thereby produces a voltage that is impressed on the primary winding of a transformer 16. The primary coil of 16 is fixedly connected at 49, to the transformer 13.

A manually-set slide contact 50 and conductor 10 impress a desired voltage on the primary winding of a 110/110 volt transformer 15, which voltage is thus manually set for a pre-determined desired constant control value.

The voltage in the secondary circuit 17 of the secondary windings and a copper oxide rectifier 18 is thereby changed, as conditions may vary. An ammeter 19 is provided in the D. C. circuit 20 of this rectifier, and a resistor 21 is in this circuit. It is through changes in voltage across this resistor that the operations of the system are controlled. Changes in this voltage are primarily effected through changes of temperature in the tank 7 and hence current flow in the thermocouple circuit 22.

A null balance voltage circuit is actuated by any voltage unbalance between the thermocouple circuit 22 and voltage across resistor 21. Any voltage unbalance will actuate a switch arm or needle 23 in a galvanometer 24. The voltage produced across resistor 21 will be changed, as hereinafter explained, as a result of a movement of pointer 14, such that a balance is always effected between thermocouple voltage 22 and the voltage across resistor 21.

In a typical control application such as that shown in the drawing, the primary of the autotransformer 16 is connected to the 25-volt primary winding tap. With 1000 ohms resistance at 21 and a tap at .0503 ohm, the ammeter 19 will be caused to show a reading of 100 milliamperes, resistor tap voltage of 5.03 millivolts, at a temperature of 200° F.

Assuming that is is desired to maintain the temperature of the water in the tank 7 at 160° F. and that there is a constant flow out of the tank, through the pipe 9, the steam valve 6 will be maintained in a partly opened position to supply the required quantity of steam to maintain this temperature. The manually-set slide contact member 50 is so positioned that the secondary voltage produced by the transformer 15 is 76 volts. Thus this 76 volt potential in circuit 17 is the desired constant point. When the autotransformer pointer 14 will be at the midpoint and at this 160° F. temperature, the ammeter 19 will register 76 milliamperes. The galvanometer needle 23 will be at the midpoint and the relay switches at 25 and 26 deenergized.

If the demand at the tank 7 suddenly increases, or the steam pressure drops, the temperature in the tank will drop. Assuming that the temperature drops 10° F., which results in a 6% change in the full scale reading of the instrument, the voltage produced by the thermocouple will drop and cause a current to flow through the galvanometer 24, as the voltage produced at the resistor 21 equals 3.81 millivolts, and the thermocouple produces 3.50 millivolts, at 150° F. The galvanometer needle 23 engages the contact member 27, thus short circuiting a resistor 28, which reduces the bias in the tube 29, to conduct current and energize the relay switch 25. Closing of the relay switch completes the circuit through the motor 5 to effect opening of the steam valve and also simultaneously completes the circuit through the motor 31 to effect a change in the voltage at resistor 21, so that the galvanometer will return to zero or balance.

In order to effect or permit the return of the galvanometer to zero position, the current through the resistor 21 must be changed from 76 milliamperes to 70 milliamperes; .076×.0503 equals 3.81 millivolts equals 160° F., and .070×.0503 equals 3.50 millivolts equals 150° F. The voltage across the resistor 21 must change from 76 volts to 70 volts. The voltage supplied by the transformer 16 is 76 volts. This 76 volt output of transformer 15 determines the control point. In this description, it is assumed there is no energy lost through the change from A. C. to D. C., at the copper oxide rectifier. There will actually be some slight losses, but the fundamental operation and theory is unchanged.

If the voltage across the resistor 21 is to be changed from 76 volts to 70 volts to effect a voltage balance, and the voltage output of the transformer 15 is constant at 76, then a subtractive voltage of six volts must be produced by the transformer 16. This six volts potential is generated by a movement of the pointer 14 as a result of the motor 31 being energized by relay switch 25, as described above. The voltage ratio of the transformer 16 is 25/50. Therefore, a three-volt change is required in the primary of transformer 16 to produce a six volt change in circuit 17.

The motor 31 will effect a change of 50 volts in 60 seconds, or ⅚ volt per second. To effect a change of three volts, 3.6 seconds are therefore required. In 3.6 seconds, the voltage across the resistor 21 will change from 76 volts to 70 volts, and this, in turn, will cause the tap voltage at 21 to balance the thermocouple voltage. With zero voltage difference, the galvanometer 24 will return to zero as shown on the drawing. The short circuit of the resistor 28 is therefore removed and the bias is then on the vacuum tube 29. The relay switch at 25 is therefore deenergized and the motors 5 and 31 stopped.

During the rebalance of the voltage across the resistor 21, the motor 5 was running for 3.6 seconds, and the valve 6 will have been moved for approximately 3% of its total travel. Thus for a 6% change (of full instrument range) of the temperature under measurement, the steam-supply valve 6 will be moved 3%. By changing the speed of the motor 31, with respect to the motor 5 and/or changing the primary tap of the transformer 16, any throttling range can be obtained to suit the particular control application.

The above description is for an application that requires 200% throttling range. This is defined as a 50% operator or valve movement with respect to a 100% change of the voltage under measurement. For particular types of application, it is desirable that the throttling range be for example 300%. To design a control system that will permit ready and convenient change of the throttling range is a practical requirement.

This change in response or throttling range is necessary to obtain stability of the system under control. In some applications in order that the system is stable and will not hunt, it is necessary that the corrective energy level be changed at a very slow rate. In other systems, it is desired that the correction be made as rapidly as possible, but in all cases, it is desired that the rate of correction be as rapid as the stability of the system will permit and this requires readily adjustable means for changing the rate of response of the corrective energy level with respect to the change in the variable voltage under measurement.

The system herein proposed can accomplish a flexible adjustment of the throttling range for the ratio of response of movement of the remote operator (motor 5) with respect to the rate of rebalancing of the voltage under measurement (by the motor 31), by changing the rate at which the correction voltage is produced through movement of the motor 31. This can be done by changing the transformer tap at 16 or by changing the gear ratio of motor 31 (gears 36—37), or by changing the gear ratio between the motor 5 and the valve 6.

To compensate for control point shift that is caused by load change, an automatic reset circuit is included. As soon as the pointer 14 of the transformer 13 has been moved in one direction from its neutral point, or at any time the thermocouple circuit 22 is not exactly 3.31 millivolts, a switch at 33 is closed to start a motor 34. The motor 34 through a shaft 35, gearing 36 and 37 and a shaft 38 will drive the pointer 14 back to the neutral point. The frame of the motor 31 is mounted on the gear 37. This motor 34, when it runs, has the same effect as motor 31 except its effect is governed by the gear ratio of gears 36 and 37 and the final result is slow movement of the shaft 38 and pointer 14. The motor 31 is equipped with flexible pigtail electrical connections. This changes the voltage at the transformer 16 which, in turn, causes change in the voltage at resistor 21. These changes will result in again unbalancing of the galvanometer to effect closing of the circuit through the switches 25 or 26 and thereby again effect operation of the motors 5 and 31. This control movement caused by the motor 34 will result in movement of the steam valve motor 5 at a rate equal to the following: voltage on the primary winding of the transformer 16 equal 60+50 or ⅚ volt per minute of running. This ⅚ volt per minute could be balanced by the motor 31 running one second. Whenever the motor 31 is in operation, the motor 5 is also energized. This one second of movement will represent .8% valve moment.

Thus after temperature in the tank changes from 160° F. to 150° F., the steam valve is opened for 3.6 seconds or 3% additional opening. Every one minute thereafter, the valve is moved .8% until the temperature returns to the control point or the voltage output of transformer 16 equals zero. The reset control is adjustable in magnitude by changing the speed or the gear ratio of the motor 34, and/or the gear ratio of gears 36 and 37.

If now, the temperature increases above the desired 160° F., the change in voltage by the thermocouple will be such as to cause the galvanometer needle 23 to close the circuit at contact member 39, thus closing the magnetically-operated switch 26 and effecting reversal of the motor 5, to reduce the steam supply, and also reversing the motor 31, for movement of the pointer 14 in the opposite direction.

The switches 33 and 40 are operated by a tooth 41 on a cam disc 42, that is secured to the shaft 38. The switch at 33 will be closed whenever the cam tooth has been rotated to the right of the vertical mid point, or whenever the pointer 14 is above its mid point. The switch 40 will be closed whenever the cam tooth has been rotated to the left of the vertical mid line and the pointer 14 is below its mid point. When the cam tooth 41 is at the vertical mid point as shown on the drawing, both switches 33—40 are open.

The cam 42 also operates limit switches at 44 and 45. When the pointer 14 is at approximately 135 degrees below its neutral point, at one side, the cam tooth 41 will open the switch 44, to stop operation of the motors 5, 31 and 34 in a given direction. When the pointer is moved 135 degrees to the opposite direction, the switch 45 will be opened to prevent further operation of the motors 5, 31 and 34 in the other direction.

Since either the switch 33 or the switch 40 is closed at such time, the motor 34 will be energized in a direction to restore the pointer 14 to its neutral position and the switches 33, 40, 44 and 45 to their normal positions shown in the drawing.

While the motors are shown as wired for D. C. current, it will be understood that A. C. motors can be used in the system.

I claim as my invention:

1. An electrical control system comprising a null balance circuit, for measuring an electric potential and controlling an energy level at a specific point where the electric potential is generated proportional to that energy level, a potentiometer for the null circuit, an electric motor that is automatically operated through changes in the said voltage, to operate the potentiometer and maintain a voltage balance in the null balance circuit, a second motor controlled by the first-named motor and operable to effect a change in the degree of energy manifested at the said point, means for changing the extent of movement of the second named motor with respect to a given percent change in the voltage being measured, a variable ratio transformer for varying the potential produced in the null balance circuit per increment of motion of the potentiometer slider, to effect any desired duration or percentage of movement of the second-named motor for a given percentage of change in the potential undergoing measurement.

2. An electrical control system comprising an electrical measuring circuit, means for producing therein a potential that is proportional to energy that is manifested at a given location and is subject to fluctuations through changes from a predetermined energy level at the specific location, an electrically-responsive switch movable in either of two directions from the neutral position, in response to fluctuations in said circuit, a control circuit closed by the switch when moved in one direction through decrease of energy from said level, a second control circuit closed by the switch when moved in the opposite direction upon increase of energy above said level, a reversible motor controlled for movement in opposite directions by the respective control circuits, a null balance system for the measuring circuit, a potentiometer slider movable from its normal position by said motor, to bring the potential undergoing measurement and the measuring circuit into null balance and thereby restore the switch to its neutral position, a second reversible motor, whose direction and duration of rotation is controlled by the said measuring circuit, in response to said fluctuations from a predetermined energy level at the said location, and serving to effect increase or decrease in the degree of energy manifested at said location, and thus effect restoration of the predetermined energy level, a third reversible electric motor for moving the potentiometer slider, in either direction, to effect unbalance of the null system relative to the measuring circuit, a pair of switches respectively controlling the direction of movement of the third motor, so that the third-named motor is energized at any time that the fluctuating potential that is undergoing measurement differs from the predetermined desired valve, to thereby effect return of the potentiometer slider, to its normal position, and means associated with the potentiometer slider, for closing one of these switches when the slider is moved in one direction and for closing the other switch when the slider is moved in the opposite direction, the said means serving also to open both of these last-named switches when the slider reaches its normal or neutral mid-position, thereby placing the system in condition for successive repeat operations for so long as said energy is in excess of or less than said level.

3. A control system as recited in claim 2, wherein the potentiometer slider is returned to its said normal or original position at a slow rate relative to the speed at which it has been moved by the first-named motor.

JOHN L. MICHAELIS.

REFERENCES CITED

The following references are of record in the file of this patent:

UNITED STATES PATENTS

| Number | Name | Date |
| --- | --- | --- |
| 2,313,079 | Lilja | Mar. 9, 1943 |